United States Patent
Hull et al.

(10) Patent No.: US 9,404,464 B2
(45) Date of Patent: Aug. 2, 2016

(54) CONTROLLED ENGINE SHUTDOWN METHOD AND ENGINE SHUTDOWN PREDICTION FOR EXHAUST SYSTEM DURABILITY

(71) Applicant: Deere & Company, Moline, IL (US)

(72) Inventors: Mark E. Hull, Peosta, IA (US); Steven R. Sass, Dubuque, IA (US); John C. Lauper, Cuba City, WI (US); Anthony K. Kraft, Dubuque, IA (US); Thomas L. Kennedy, Dubuque, IA (US)

(73) Assignee: Deere & Company, Moline, IL (US)

( * ) Notice: Subject to any disclaimer, the term of this patent is extended or adjusted under 35 U.S.C. 154(b) by 184 days.

(21) Appl. No.: 14/029,881

(22) Filed: Sep. 18, 2013

(65) Prior Publication Data

US 2015/0075490 A1   Mar. 19, 2015

(51) Int. Cl.
*F02D 28/00*   (2006.01)
*F02N 11/08*   (2006.01)
(Continued)

(52) U.S. Cl.
CPC .......... *F02N 11/0829* (2013.01); *F02D 41/029* (2013.01); *F02D 41/042* (2013.01); *F02D 41/1446* (2013.01); *F02N 11/0818* (2013.01);
(Continued)

(58) Field of Classification Search
CPC .............. F02D 41/042; F01N 2560/06; F01N 2900/1404; F01N 2900/1602; Y02T 10/48
USPC ............ 123/302, 332, 179.4, 198 D, 198 DB, 123/198 F; 701/104, 105, 107, 110, 112, 701/114; 60/274–278, 285, 286, 295, 297
See application file for complete search history.

(56) References Cited

U.S. PATENT DOCUMENTS 3,680,539 A    8/1972   Savage et al.
4,656,973 A    4/1987   Endres
(Continued)

FOREIGN PATENT DOCUMENTS

DE   102013210382 A1   12/2013
EP      0327954 A2      8/1989
(Continued)

OTHER PUBLICATIONS

JP 2003 239724 English Translation Version.*
(Continued)

*Primary Examiner* — John Kwon
*Assistant Examiner* — Johnny H Hoang
(74) *Attorney, Agent, or Firm* — Taft Stettinius & Hollister LLP; Stephen F. Rost

(57) ABSTRACT

A controlled engine shutdown method is disclosed that includes monitoring exhaust system temperature, monitoring operator shutdown commands, and delaying engine shutdown based on exhaust system temperature. The method can include inhibiting any process that affects exhaust temperatures, for example DPF regeneration. The method can use a shutdown timer, allow operator override of the shutdown delay, and display a delay notification message. The method can also include predicting when an engine shutdown is expected, and delaying or aborting any process that would affect exhaust temperatures when an engine shutdown is predicted. Predicting can include monitoring various machine states, determining an average activity interval for the machine, determining a geographic shutdown area, determining a shutdown time of day and/or monitoring a machine fluid level.

19 Claims, 4 Drawing Sheets

(51) Int. Cl.
*F02D 41/02* (2006.01)
*F02D 41/04* (2006.01)
*F02D 41/14* (2006.01)
*F02D 41/22* (2006.01)

(52) U.S. Cl.
CPC ..... *F02D 41/0225* (2013.01); *F02D 2041/1412* (2013.01); *F02D 2041/228* (2013.01); *F02D 2200/0802* (2013.01); *F02D 2200/701* (2013.01); *F02N 2200/0802* (2013.01); *Y02T 10/48* (2013.01)

(56) References Cited

U.S. PATENT DOCUMENTS

| | | | |
|---|---|---|---|
| 5,121,324 | A * | 6/1992 | Rini et al. ................ 701/105 |
| 6,242,873 | B1 | 6/2001 | Drozdz et al. |
| 6,516,251 | B1 * | 2/2003 | Chene et al. ................ 701/1 |
| 6,529,815 | B2 * | 3/2003 | Hawkins et al. .......... 701/104 |
| 7,497,076 | B2 * | 3/2009 | Funk et al. ................ 60/286 |
| 8,757,315 | B1 | 6/2014 | Wuisan et al. |
| 2003/0045977 | A1 | 3/2003 | Sato et al. |
| 2005/0056260 | A1 | 3/2005 | Ellies et al. |
| 2006/0015244 | A1 * | 1/2006 | Hawkins et al. ........... 701/112 |
| 2009/0139212 | A1 * | 6/2009 | Miwa ........................ 60/277 |
| 2010/0052882 | A1 * | 3/2010 | Sverrisson et al. ...... 340/426.11 |
| 2010/0156117 | A1 * | 6/2010 | Allen ........................ 290/40 C |
| 2011/0000463 | A1 * | 1/2011 | Kokotovic et al. ........ 123/457 |
| 2011/0072791 | A1 * | 3/2011 | Bidner et al. ................ 60/278 |
| 2012/0123666 | A1 * | 5/2012 | Stoffels et al. .............. 701/113 |
| 2013/0110374 | A1 * | 5/2013 | Boesch ....................... 701/102 |
| 2013/0332054 | A1 * | 12/2013 | Kristinsson ......... F02N 11/0837 701/113 |

FOREIGN PATENT DOCUMENTS

| | | |
|---|---|---|
| EP | 2055916 A2 | 5/2009 |
| JP | 2003239724 A | 8/2003 |
| JP | 2005105949 A | 4/2005 |
| WO | WO2011117491 A1 | 9/2011 |

OTHER PUBLICATIONS

JP 2005 105949 English Translation Version.*
European Patent Office, Munich Germany, European Search Report, dated May 28, 2015, pp. 1-8.

* cited by examiner

CONTROLLED ENGINE SHUTDOWN METHOD AND ENGINE SHUTDOWN PREDICTION FOR EXHAUST SYSTEM DURABILITY

FIELD OF THE INVENTION

The present invention generally relates to the field of software control of motorized machinery and more specifically to software prediction and control of engine shutdown for exhaust system durability.

BACKGROUND OF THE INVENTION

Modern machinery can include one or more subsystems in their exhaust systems, for example subsystems to reduce emissions of certain materials for compliance with emissions regulations. Some of these subsystems may be more susceptible to damage from heat or other factors than other exhaust subsystems. It would be desirable to have systems in place that can help protect some of these more susceptible subsystems from factors that can reduce their effectiveness or durability.

For example, a machine exhaust system can include a diesel particulate filter (DPF), a DPF regeneration system, and a diesel exhaust fluid (DEF) dosing unit. The DPF collects soot and other particulates in the machine exhaust. During DPF regeneration, diesel fuel can be used to increase exhaust temperatures and clean the DPF. The DEF dosing unit can be used to inject urea into the exhaust stream in order to reduce NOx to meet emissions regulations. The DEF dosing unit can be installed downstream of the DPF where, during DPF regenerations, exhaust temperatures can become significantly elevated. In this scenario, during DPF regenerations, the DEF dosing unit is also exposed to these high exhaust temperatures used for cleaning the DPF. The DEF dosing unit can be cooled by both engine coolant and the urea that it is injecting while the engine is running. If the machine is shutdown during DPF regeneration, the elevated exhaust temperatures and exhaust energy can be trapped in the insulated exhaust tubing. The DEF dosing unit is then trapped in significantly high temperatures for a long period of time, which can lead to component damage and ultimately component failure. The DEF dosing unit is most susceptible to failure during this shutdown condition (engine not running), because when the engine is shutdown, the engine coolant and urea flow which usually cool the DEF dosing unit also stop. Thus, for this situation, it would be desirable to have systems in place that would delay engine shutdown to allow sufficient cooling of the DEF dosing unit.

SUMMARY

A controlled engine shutdown method is disclosed for a machine having an engine and an exhaust system. The controlled engine shutdown method includes monitoring an exhaust system temperature, monitoring operator commands including an engine shutdown command, and delaying engine shutdown when the operator issues an engine shutdown command based on whether the exhaust system temperature exceeds a temperature threshold. The controlled engine shutdown method can also include, if engine shutdown is delayed, aborting any current process of the machine that is affecting exhaust temperatures. The exhaust system can include a diesel particulate filter (DPF), and a DPF regeneration process that affects exhaust system temperature can be used to clean the DPF. Aborting any current process of the machine that is affecting exhaust temperatures can include aborting any current DPF regeneration process. The controlled engine shutdown can also include enabling the operator to override the shutdown delay and proceed immediately to engine shutdown.

The controlled engine shutdown method can include setting a shutdown timer to a timer start value when the exhaust system temperature crosses and exceeds the temperature threshold. In an embodiment with the shutdown timer, if the shutdown timer is zero when the operator issues an engine shutdown command, the method does not delay the engine shutdown; and if the shutdown timer is greater than zero when the operator issues an engine shutdown command, the method delays shutdown of the engine until the shutdown timer counts down to zero. The controlled engine shutdown method can also include predicting when an engine shutdown is expected and inhibiting any process of the machine that would affect exhaust temperatures when an engine shutdown is predicted. The method can also include not counting down the shutdown timer when the exhaust system temperature exceeds the temperature threshold and an engine shutdown is not predicted; but counting down the shutdown timer when the exhaust system temperature exceeds the temperature threshold and an engine shutdown is predicted.

The controlled engine shutdown method can also include, when engine shutdown is being delayed, displaying a notification message visible to the operator indicating that engine shutdown is being delayed. The notification message can include a timer indicating how much longer engine shutdown is being delayed. The notification message can also include an override selection enabling the operator to override the shutdown delay and proceed immediately to engine shutdown.

The controlled engine shutdown method can also include predicting when an engine shutdown is expected, and delaying or aborting any process of the machine that would affect exhaust temperatures when an engine shutdown is predicted. Predicting when an engine shutdown is expected can include monitoring various states of the machine, determining one or more monitored states that indicate an operator is preparing to shut down the machine, and predicting an engine shutdown when the one or more monitored states indicate the operator is preparing to shut down the machine. Predicting when an engine shutdown is expected can include monitoring the gear selection for the machine, and predicting an engine shutdown when the machine is put into a parking gear. Predicting when an engine shutdown is expected can include determining an average activity interval for the machine, starting an activity timer when the machine is activated, and predicting an engine shutdown when the activity timer comes within a time threshold of the average activity interval for the machine. Predicting when an engine shutdown is expected can include determining a geographic shutdown area where the machine is usually shutdown, monitoring a current geographic position of the machine, and predicting an engine shutdown when the current geographic position of the machine is within the geographic shutdown area. Predicting when an engine shutdown is expected can include determining a shutdown time of day when the machine is usually shutdown, monitoring a current time of day, and predicting an engine shutdown when the current time of day is within a threshold time of the shutdown time of day. Predicting when an engine shutdown is expected can include monitoring a fluid level of the machine, and predicting an engine shutdown when the fluid level goes below a fluid threshold. Predicting when an engine shutdown is expected can include determining a geographic shutdown area where the machine is usually shutdown, monitoring a current geographic position of the machine, determining a shutdown time of day when the machine is usually shutdown, monitoring a current time of day, and predicting an engine shutdown when the current geographic position of the machine is within the geographic shutdown area, and the current time of day is within a threshold time of the shutdown time of day.

DETAILED DESCRIPTION

Figure 1:
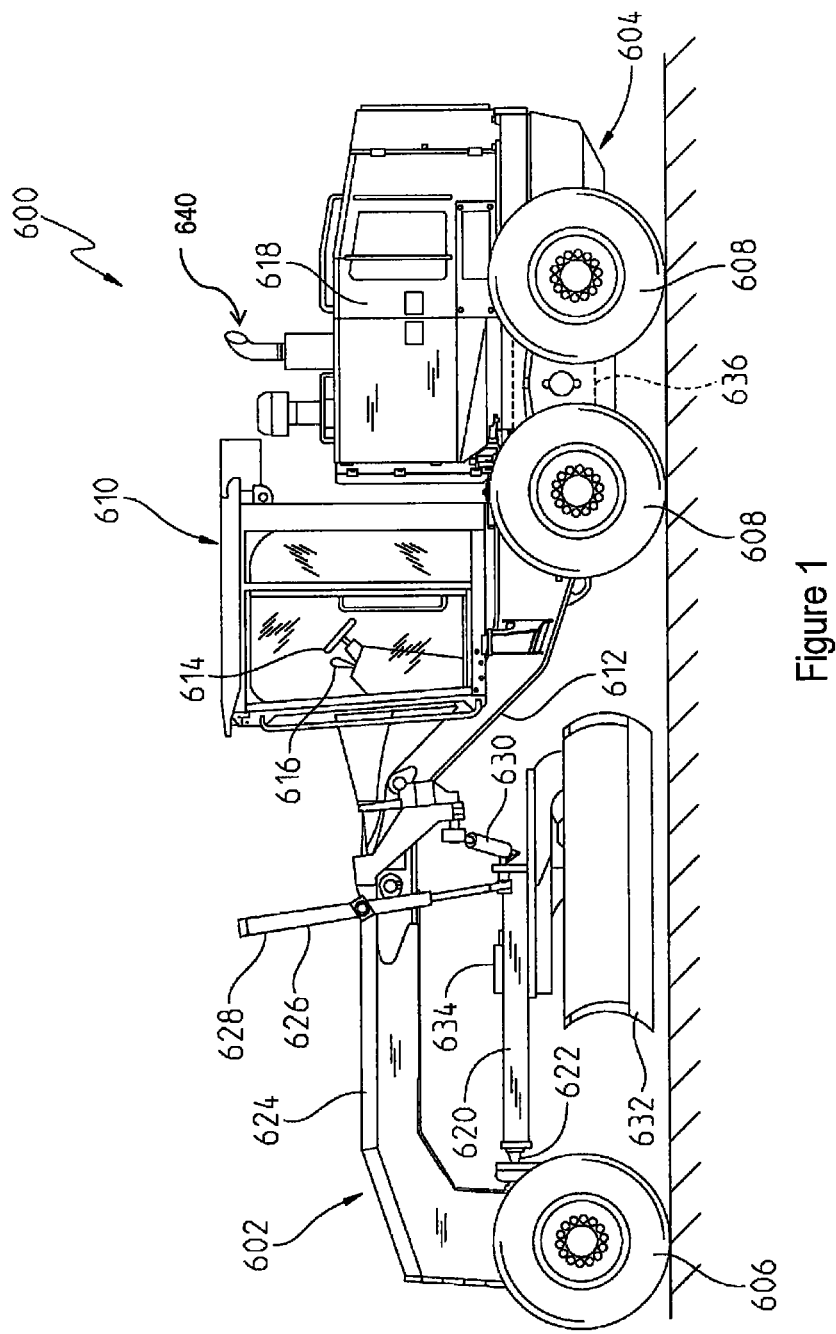
FIG. 1 illustrates an exemplary embodiment of a machine.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

FIG. 1 illustrates an exemplary embodiment of a machine, such as a motor grader 600 for spreading and leveling dirt, gravel, or other materials. An example of a motor grader is the 772G Motor Grader manufactured and sold by John Deere & Company. As shown in FIG. 1, the motor grader 600 includes an articulated chassis formed by front and rear frames 602 and 604, respectively. The front frame 602 is supported by a pair of front wheels 606, and the rear frame 604 is supported on right and left tandem sets of rear wheels 608. The front and rear wheels may take the form of any type of traction device depending on the machine.

An operator cab 610 is mounted on an upwardly and forwardly inclined rear region 612 of the front frame 602. An engine 618 is mounted on the rear frame 604 and supplies power for all driven components of the motor grader 600. An exhaust system which includes exhaust pipe 640 is coupled to the engine 618 and can filter or otherwise process and direct the emissions from the engine 618. The engine 618 can drive a transmission 636 or other power-transferring drivetrain, which is coupled for driving the rear wheels 608 at various selected speeds and either in forward or reverse modes. A hydrostatic front wheel assist transmission (not shown) may be selectively engaged to power the front wheels 606, in a manner known in the art.

Mounted to a front location of the front frame 602 is a drawbar or draft frame 620, having a forward end universally connected to the front frame 602 by a ball and socket arrangement 622 and having opposite right and left rear regions suspended from an elevated central section 624 of the front frame 602 by right and left lift linkage arrangements including right and left extensible and retractable hydraulic actuators 626 and 628, respectively. A side shift linkage arrangement is coupled between the elevated frame section 624 and a rear location of the drawbar 620 and includes an extensible and retractable side swing hydraulic actuator 630. A blade 632 is coupled to the front frame 602 and powered by a circle drive assembly 634.

The features described above and shown in FIG. 1 may be provided on other machines or vehicles having one or more ground engaging work tools or traction devices, such as wheels and tracks, used for construction, agricultural, forestry and other purposes. Moreover, the blade 632 of the motor grader 600 may also take the form of other known ground-engaging tools such as a snow plow and may engage other materials besides dirt, gravel, sand, etc.

The operator cab 610 of FIG. 1 can include a front wall, a pair of side walls, a rear wall, a roof, and a floor that define an interior space of the operator cab 610. Windows can be formed in any one of the walls. In the interior space, the operator cab 610 can include at least one operator's seat positioned therein and various controls for operating the motor grader 600 disposed so as to be within the reach of an operator. In one aspect, these controls may include a steering wheel 614 and a shift assembly 616. The steering wheel 614 can control the steering of the motor grader 600. The shift assembly 616 may be used for controlling the transmission 636.

Figure 2:
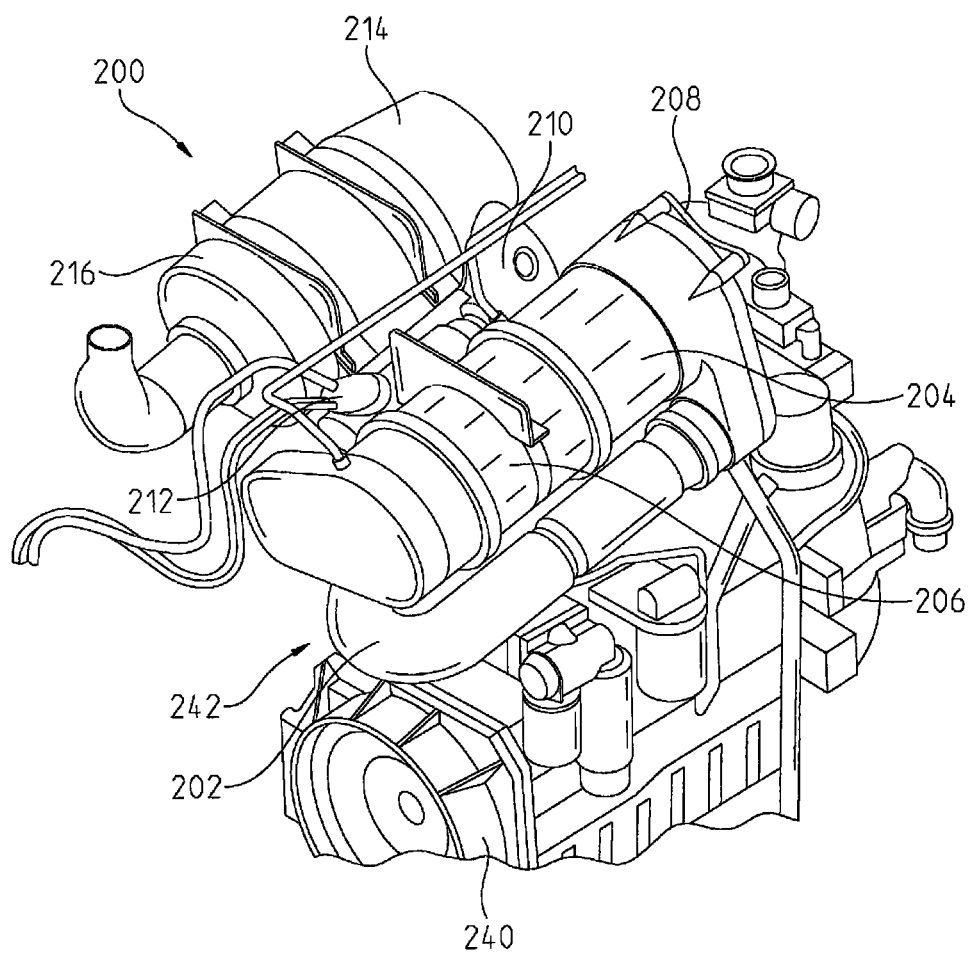
FIG. 2 illustrates an exemplary exhaust system coupled to an exemplary engine.

FIG. 2 illustrates an exemplary exhaust system 200 coupled to an exemplary engine 240. Exhaust gases exit the engine 240 and wrap through the exhaust system 200. The exhaust gases exit the engine 240 at an engine outlet 242 and enter an exhaust pipe 202 of the exhaust system 200 which leads to a diesel oxidation catalyst (DOC)/diesel particulate filter (DPF) can 204. The DOC/DPF can 204 includes the DOC at the front end and the DPF 206 at the back end. The DPF 206 collects soot and during DPF regeneration, diesel fuel is injected into the DOC/DPF can 204 through a diesel fuel injector 208 and ignited to burn off the soot from the DPF 206. The DOC/DPF can 204 can also include temperature and pressure sensors. The DPF regeneration cleans the DPF 206 and prevents clogging of the exhaust system 200. An exhaust system can periodically perform DPF regeneration and can reach high temperatures during DPF regeneration. The exhaust stream passes through the DPF 206 and enters a decomposition tube 210. A urea injector 212 injects urea into the exhaust stream in the decomposition tube 210 and the urea is decomposed into ammonia. After passing through the decomposition tube 210, the exhaust stream enters a selective catalytic reduction (SCR) can 214 where the NOx reacts with the ammonia to produce nitrogen and water. The SCR can 214 can also include NOx sensors and temperature sensors. The remaining ammonia that gets through the SCR 214 can be further cleaned up by an ammonia oxidation catalyst (AOC) 216.

Processes can be initiated in the exhaust system 200, for example the igniting of diesel fuel during DPF regeneration, that generate high exhaust temperatures that can be deleterious to components of the exhaust system 200. The term "DPF regeneration" will be used throughout this disclosure as a general term encompassing not only a diesel particulate filter regeneration process but any time the engine control system is intentionally elevating exhaust temperatures. This could be for: DPF regeneration, DOC hydro-carbon cleanout, urea crystallization sublimation, selective catalytic reduction (SCR) de-sulfurization, and any other instances where elevated exhaust temperatures are produced. For example, sensors or injectors in the exhaust system 200 can include plastic or electronic parts that can be damaged by high exhaust temperatures. While the engine 240 is running, engine coolant, injected urea and other processes help dissipate the high exhaust temperatures. However, these heat dissipating processes are usually shut down when the engine 240 is shut down.

A control system can delay the shutdown of a machine engine upon the operator requesting a shutdown when a high exhaust temperature process, for example DPF regeneration, is underway. The control system can delay the engine shutdown and/or abort the DPF regeneration, and idle the engine for a period of time in order to cool the exhaust system. The operator could still have the option to override the delay and immediately proceed with the shutdown if needed.

The damage that can be caused to more heat susceptible systems, for example the DEF dosing unit, sensors, injectors, etc., usually occurs when the engine is shut down during a DPF regeneration because cooling processes that help in cooling these heat susceptible systems will usually stop when the engine is shutdown. The control system can delay the engine shutdown to allow the cooling processes to continue when the operator initiates the shutdown procedure. During the time period where the engine shutdown is delayed, the control system can also abort the DPF regeneration to decrease the exhaust temperatures more rapidly. When the engine finally shuts down, the exhaust temperatures will have been sufficiently lowered so that the risk of damage to the heat susceptible systems will be mitigated.

When the operator initiates the engine shutdown sequence (using a button, key, switch, etc.) and the control system senses the exhaust temperature is too high, the control system can display a warning message on an operator display of the machine that the exhaust system requires a cooldown period. The control system can also abort the DPF regeneration. A timer or progress bar can be displayed on the operator display that indicates the amount of time remaining in the cooldown period. The operator can elect to override the delay and continue with the shutdown. If the operator elects not to override the shutdown delay, the engine will automatically shut itself off when the timer or progress bar expires.

Figure 3:
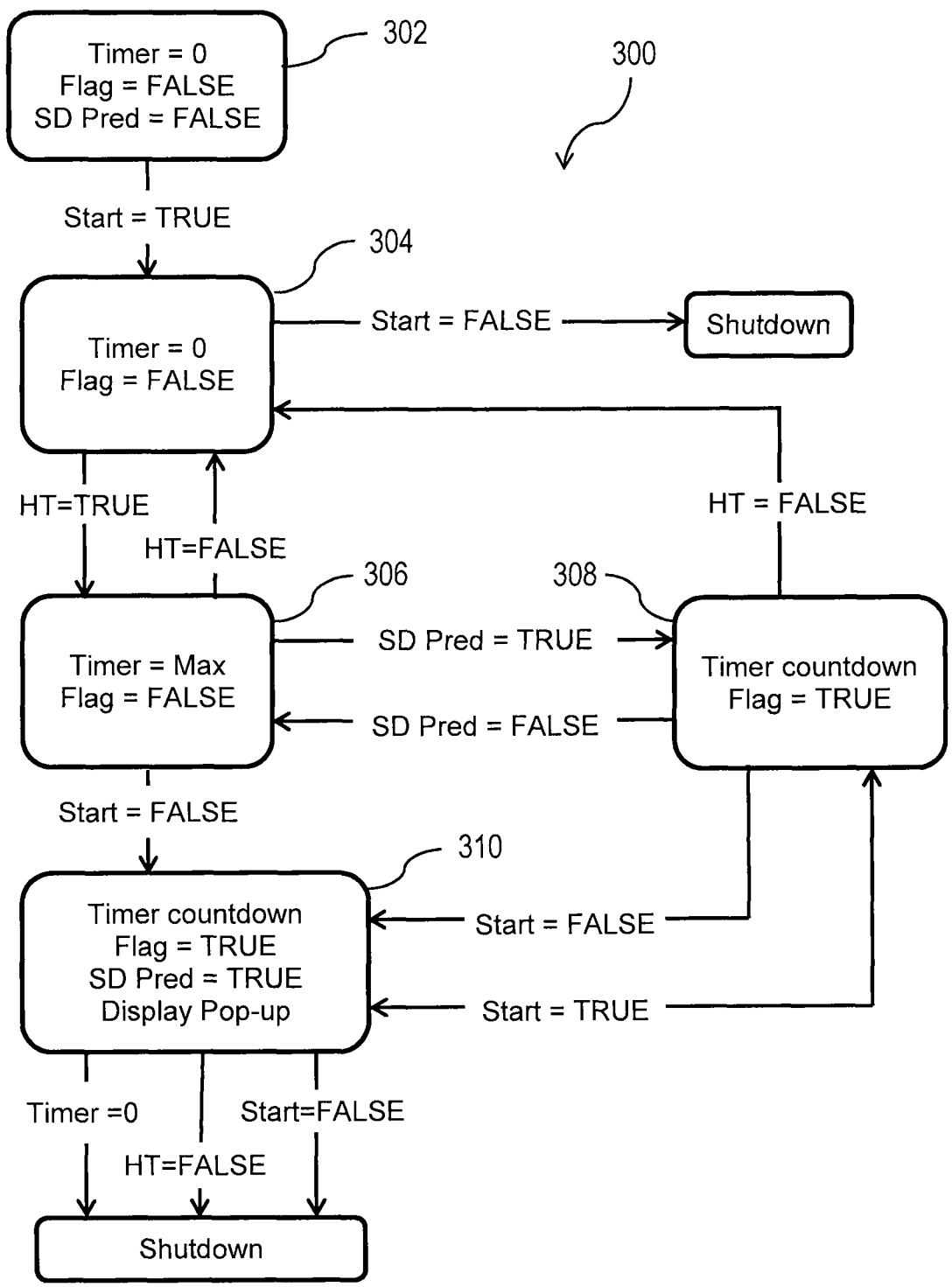
FIG. 3 illustrates an exemplary embodiment of a flow diagram for the control system.

FIG. 3 illustrates an exemplary embodiment of a flow diagram 300 for the control system that includes prediction of operator shutdown. The ignition switch is wired to a vehicle control unit (VCU) which receives a signal when the operator activates the ignition switch to start or shutdown the machine. At block 302, when the ignition switch is activated at machine start-up, a shutdown timer is set to 0, an inhibit flag is set to FALSE, and a shutdown prediction flag (SD Pred) is set to FALSE. The inhibit flag indicates whether DPF regeneration is being turned off (inhibited) to lower exhaust temperatures. The shutdown timer indicates the time duration of the shutdown delay in which the machine engine idles. The shutdown prediction flag indicates whether the control system currently predicts that the operator will soon issue a machine shutdown command. When the engine of the machine is running, a start flag is set to TRUE and control passes to block 304. The start flag indicates whether the current operator command is for engine running (TRUE) or shutdown (FALSE).

At block 304, the engine is running and the exhaust temperature is not above a temperature threshold. Exhaust temperatures can be monitored using various methods known in the art, for example monitored using physical temperature sensors, modeled or predicted using other parameters and/or virtual sensors, etc. A high temperature (HT) flag can be set to indicate whether the exhaust system is above a temperature threshold. Upon entering block 304, the shutdown timer is set to 0 and the inhibit flag is set to FALSE. At block 304, when the exhaust system temperature exceeds the temperature threshold, the high temperature (HT) flag is set (HT=TRUE), control passes to block 306. At block 304, if the operator issues a shutdown command, the start flag is set to FALSE indicating that the current operator command is for engine shutdown and the engine is shut down without delay. At block 304 there is no shutdown delay since the exhaust temperature is not above the temperature threshold.

At block 306, the engine is running, the emission temperature is above a temperature threshold (HT=TRUE) and an engine shutdown has not been predicted (SD Pred=FALSE). Upon entering block 306, the shutdown timer is set to a maximum timer value, and the inhibit flag is set to FALSE. At block 306, when the control system predicts that the operator will soon issue a shutdown command, the shutdown prediction flag is set (SD Pred=TRUE) and control passes to block 308. At block 306, when the exhaust system temperature goes back below the temperature threshold, the high temperature flag is reset (HT=FALSE) and control passes back to block 304. At block 306, if the operator issues a shutdown command, the start flag is set to FALSE and control passes to block 310.

At block 308, the engine is running, the emission temperature is above a temperature threshold (HT=TRUE) and an engine shutdown has been predicted (SD Pred=TRUE). Upon entering block 308, the shutdown timer starts or continues counting down to 0, and the inhibit flag is set to TRUE. At block 308, when the control system predicts that the operator will not soon issue a shutdown command, the shutdown prediction flag is reset (SD Pred=FALSE) and control passes back to block 306. At block 308, when the exhaust system temperature goes back below the temperature threshold, the high temperature flag is reset (HT=FALSE) and control passes back to block 304. At block 308, if the operator issues a shutdown command, the start flag is set to FALSE and control passes to block 310.

Figure 4:
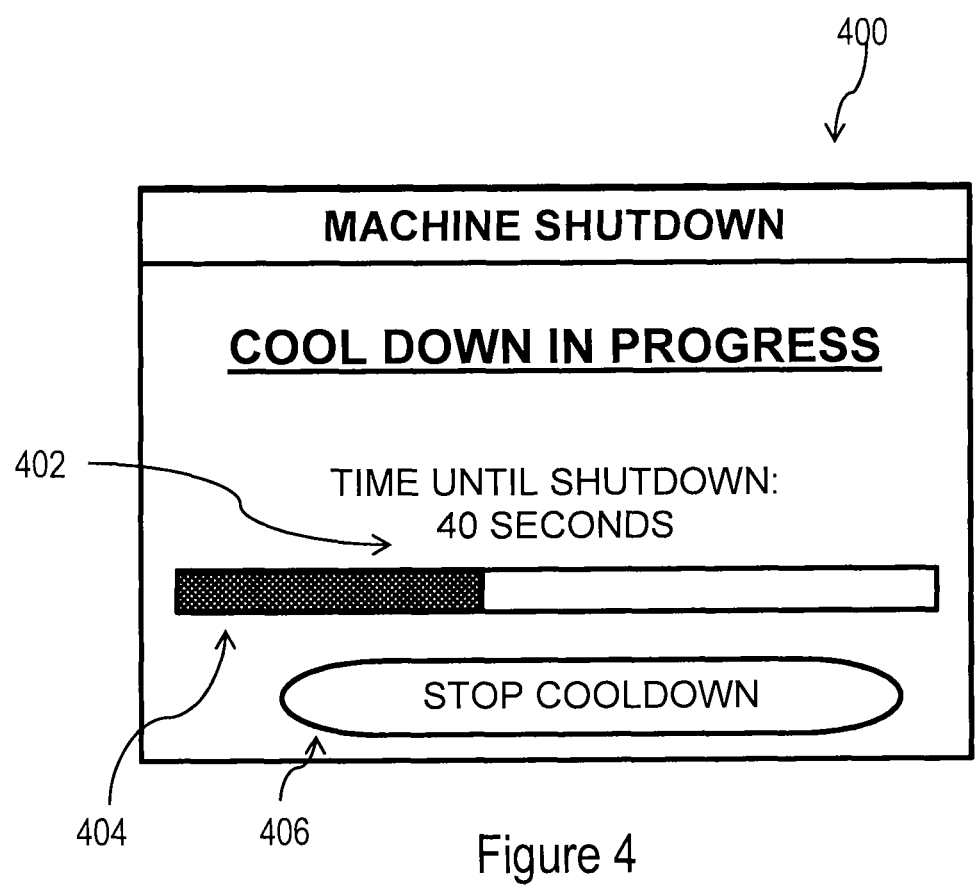
FIG. 4 illustrates an exemplary cooldown notification window.

At block 310, the operator has issued a shutdown command and the engine shutdown is being inhibited for exhaust cooldown because the exhaust temperature is above the temperature threshold (HT=TRUE). Upon entering block 310, the inhibit flag is set to TRUE indicating that DPF regeneration is currently being inhibited, the shutdown prediction flag is set (SD Pred=TRUE), a notification window is displayed for the operator and the shutdown timer starts or continues counting down. An exemplary cooldown notification window 400 is illustrated in FIG. 4. The notification window 400 includes an active timer 402, a progress bar 404 and a cooldown override selection 406 which the operator can select to override the delay and immediately begin engine shutdown. At block 310, if the shutdown timer counts down to zero, indicating that sufficient cooldown time has elapsed, the machine engine is shutdown. At block 310, if the exhaust system temperature goes back below the temperature threshold, the high temperature flag is reset (HT=FALSE) and the machine engine is shutdown. At block 310, if the operator withdraws the shutdown command or issues a new engine start command, the start flag is set to TRUE indicating that the current operator command is for engine running and control passes to block 308. At block 310, if the operator selects the cooldown override selection 406 or otherwise elects to override the delay and immediately begin engine shutdown, the machine engine is shutdown.

The control system can use various methods to predict when an operator is most likely to shut down the engine on a machine. If it is predicted that the operator will shut down the engine, then the control system can avoid or abort a DPF regeneration in order to start cooling the exhaust system prior to the predicted engine shutdown. Some exemplary shutdown prediction methods that the control system can use are described below.

A first exemplary shutdown prediction method is a learning method in which different states of the machine are monitored and the control system looks for a combination of monitored states that indicate the operator is preparing the machine for shutdown. For example, on a Motor Grader, a probable time when an operator will shut down the engine is when the transmission is placed from a working gear to the park position ("PARK"). There are few instances when a Motor Grader operator would transition to "PARK" and not shutdown the engine. For another example, on an articulated dump truck (ADT), a probable time when an operator will shut down the engine is when the transmission is placed in "PARK" and the dump bed is fully raised in the stowed position. In yet other examples, the bucket position can be monitored for a loader, or the seat position can be monitored for a backhoe. One or more monitored states can be used to predict a machine shutdown.

A second exemplary shutdown prediction method is to use machine statistics (for example, JDLink data in the case of John Deere equipment) to determine the average activity interval (time between consecutive shutdown periods) for a given machine model. For example, the average Motor Grader activity interval may be approximately two hours. In this case, the control system could abort a DPF regeneration that is occurring at about two hours of machine operation since it is likely that an engine shutdown will occur soon.

A third exemplary shutdown prediction method is similar to the second method, except a specific machine's control system keeps a running average activity interval for that specific machine (instead of a population average activity interval for that type of machine) to use in the computation. In this case, the activity interval would change over time as the machine usage changes.

A fourth exemplary shutdown prediction method uses onboard GPS of the machine. The control system can learn an area where a machine is typically shutdown, for example a machinery parking area. Once the machine enters this typical shutdown area, the control system could abort DPF regeneration.

A fifth exemplary shutdown prediction method uses time of day. The software control system can learn the time of day when the machine is typically shutdown. At a specified number of minutes before this time of day, the software control system can abort DPF regeneration.

A sixth exemplary shutdown prediction method could observe fuel level and/or other machine tank levels, for example a DEF tank level. When one or more of these levels are very low, it is likely that the operator would shut down the machine to refill the fuel and/or other tank(s). When one or more of these tank levels are below some applicable threshold, the control system can abort DPF regeneration.

These exemplary shutdown prediction methods can also be combined with one another or other methods. For example, the fourth and fifth exemplary shutdown prediction methods could be combined such that the control system learns the geographic area where and time of day when a machine is typically shutdown. When the machine enters its typical shutdown area within a few minutes before or after its typical shutdown time, the control system could abort DPF regeneration.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. A controlled engine shutdown method for a machine having an engine and an exhaust system, the controlled engine shutdown method comprising:
   monitoring an exhaust system temperature;
   monitoring operator commands including an engine shutdown command;
   setting a shutdown timer to a timer start value when the exhaust system temperature exceeds a temperature threshold and the operator has not issued the engine shutdown command;
   not counting down the shutdown timer when the exhaust system temperature exceeds the temperature threshold and the operator has not issued the engine shutdown command;
   resetting the shutdown timer to zero when the exhaust system temperature goes below the temperature threshold and the operator has not issued the engine shutdown command;
   delaying engine shutdown when the operator issues the engine shutdown command based on the shutdown timer and whether the exhaust system temperature exceeds the temperature threshold;
   if the engine shutdown is delayed, aborting any current process of the machine affecting exhaust temperatures to decrease the exhaust system temperature more rapidly;
   if the shutdown timer is zero when the operator issues the engine shutdown command, not delaying the engine shutdown; and
   if the shutdown timer is greater than zero when the operator issues the engine shutdown command, counting down the shutdown timer and delaying the engine shutdown until the shutdown timer counts down to zero.

2. The controlled engine shutdown method of claim 1, wherein the exhaust system includes a diesel particulate filter (DPF), and a DPF regeneration process that affects exhaust system temperature is used to clean the DPF, and
   wherein aborting any current process of the machine affecting exhaust temperatures comprises aborting any current DPF regeneration process.

3. The controlled engine shutdown method of claim 1, further comprising:
   enabling the operator to override the shutdown delay and proceed immediately to engine shutdown.

4. The controlled engine shutdown method of claim 1, further comprising:
   making an engine shutdown prediction when it is expected that the operator will soon issue the engine shutdown command, the engine shutdown prediction being made before the operator issues the engine shutdown command;
   inhibiting any process of the machine that would affect exhaust temperatures when the engine shutdown prediction is made;
   not counting down the shutdown timer when the exhaust system temperature exceeds the temperature threshold and the engine shutdown prediction is not made;
   counting down the shutdown timer when the exhaust system temperature exceeds the temperature threshold and the engine shutdown prediction is made;
   if the shutdown timer is zero when the operator issues an engine shutdown command, not delaying the engine shutdown; and if the shutdown timer is greater than zero when the operator issues an engine shutdown command, delaying shutdown of the engine until the shutdown timer counts down to zero.

5. A controlled engine shutdown method for a machine having an engine and an exhaust system, the controlled engine shutdown method comprising:
monitoring an exhaust system temperature;
setting a shutdown timer to a timer start value when the exhaust system temperature crosses and exceeds a temperature threshold and the operator has not issued the engine shutdown command;
monitoring operator commands including an engine shutdown command;
delaying engine shutdown when the operator issues the engine shutdown command based on the shutdown timer and whether the exhaust system temperature exceeds the temperature threshold;
if the shutdown timer is zero when the operator issues the engine shutdown command, not delaying the engine shutdown; and
if the shutdown timer is greater than zero when the operator issues the engine shutdown command, counting down the shutdown timer and delaying the engine shutdown until the shutdown timer counts down to zero.

6. The controlled engine shutdown method of claim 5, further comprising:
making an engine shutdown prediction when it is expected that the operator will soon issue the engine shutdown command, the engine shutdown prediction being made before the operator issues the engine shutdown command;
inhibiting any process of the machine that would affect exhaust temperatures when the engine shutdown prediction is made;
not counting down the shutdown timer when the exhaust system temperature exceeds the temperature threshold and the engine shutdown prediction is not made; and
counting down the shutdown timer when the exhaust system temperature exceeds the temperature threshold and the engine shutdown prediction is made.

7. The controlled engine shutdown method of claim 6, further comprising:
when the engine shutdown is being delayed, displaying a notification message visible to the operator indicating that the engine shutdown is being delayed.

8. The controlled engine shutdown method of claim 7, wherein the notification message includes a timer indicating how much longer engine shutdown is being delayed.

9. The controlled engine shutdown method of claim 8, wherein the notification message includes an override selection enabling the operator to override the shutdown delay and proceed immediately to engine shutdown.

10. The controlled engine shutdown method of claim 6, further comprising:
if the engine shutdown is delayed, aborting any current process of the machine affecting exhaust temperatures.

11. The controlled engine shutdown method of claim 10, further comprising:
when engine shutdown is being delayed, displaying a notification message visible to the operator indicating that engine shutdown is being delayed.

12. A controlled engine shutdown method for a machine having an engine and an exhaust system, the controlled engine shutdown method comprising:
monitoring an exhaust system temperature;
monitoring operator commands including an engine shutdown command;
delaying engine shutdown when the operator issues the engine shutdown command based on whether the exhaust system temperature exceeds a temperature threshold;
making an engine shutdown prediction when it is expected that the operator will issue the engine shutdown command, the engine shutdown prediction being made before the operator issued the engine shutdown command; and
inhibiting any process of the machine that would affect exhaust temperatures when the engine shutdown prediction is made.

13. The controlled engine shutdown method of claim 12, wherein making an engine shutdown prediction comprises:
monitoring various states of the machine;
determining one or more monitored states that indicate the operator is preparing to shut down the machine; and
making an engine shutdown prediction when the one or more monitored states indicate the operator is preparing to shut down the machine.

14. The controlled engine shutdown method of claim 12, wherein making an engine shutdown prediction comprises:
monitoring the gear selection for the machine; and
making an engine shutdown prediction when the machine is put into a parking gear.

15. The controlled engine shutdown method of claim 12, wherein making an engine shutdown prediction comprises:
determining an average activity interval for the machine;
starting an activity timer when the machine is activated; and
making an engine shutdown prediction when the activity timer comes within a time threshold of the average activity interval for the machine.

16. The controlled engine shutdown method of claim 12, wherein making an engine shutdown prediction comprises:
determining a geographic shutdown area where the machine is usually shutdown;
monitoring a current geographic position of the machine; and
making an engine shutdown prediction when the current geographic position of the machine is within the geographic shutdown area.

17. The controlled engine shutdown method of claim 12, wherein making an engine shutdown prediction comprises:
determining a shutdown time of day when the machine is usually shutdown;
monitoring a current time of day; and
making an engine shutdown prediction when the current time of day is within a threshold time of the shutdown time of day.

18. The controlled engine shutdown method of claim 12, wherein making an engine shutdown prediction comprises:
monitoring a fluid level of the machine; and
making an engine shutdown prediction when the fluid level goes below a fluid threshold.

19. The controlled engine shutdown method of claim 12, wherein making an engine shutdown prediction comprises:
determining a geographic shutdown area where the machine is usually shutdown;
monitoring a current geographic position of the machine;
determining a shutdown time of day when the machine is usually shutdown;

monitoring a current time of day; and making an engine shutdown prediction when the current geographic position of the machine is within the geographic shutdown area, and the current time of day is within a threshold time of the shutdown time of day.

\* \* \* \* \*